W. WEBBER.
MOWING MACHINE.
APPLICATION FILED JUNE 23, 1910.
995,829.
Patented June 20, 1911.
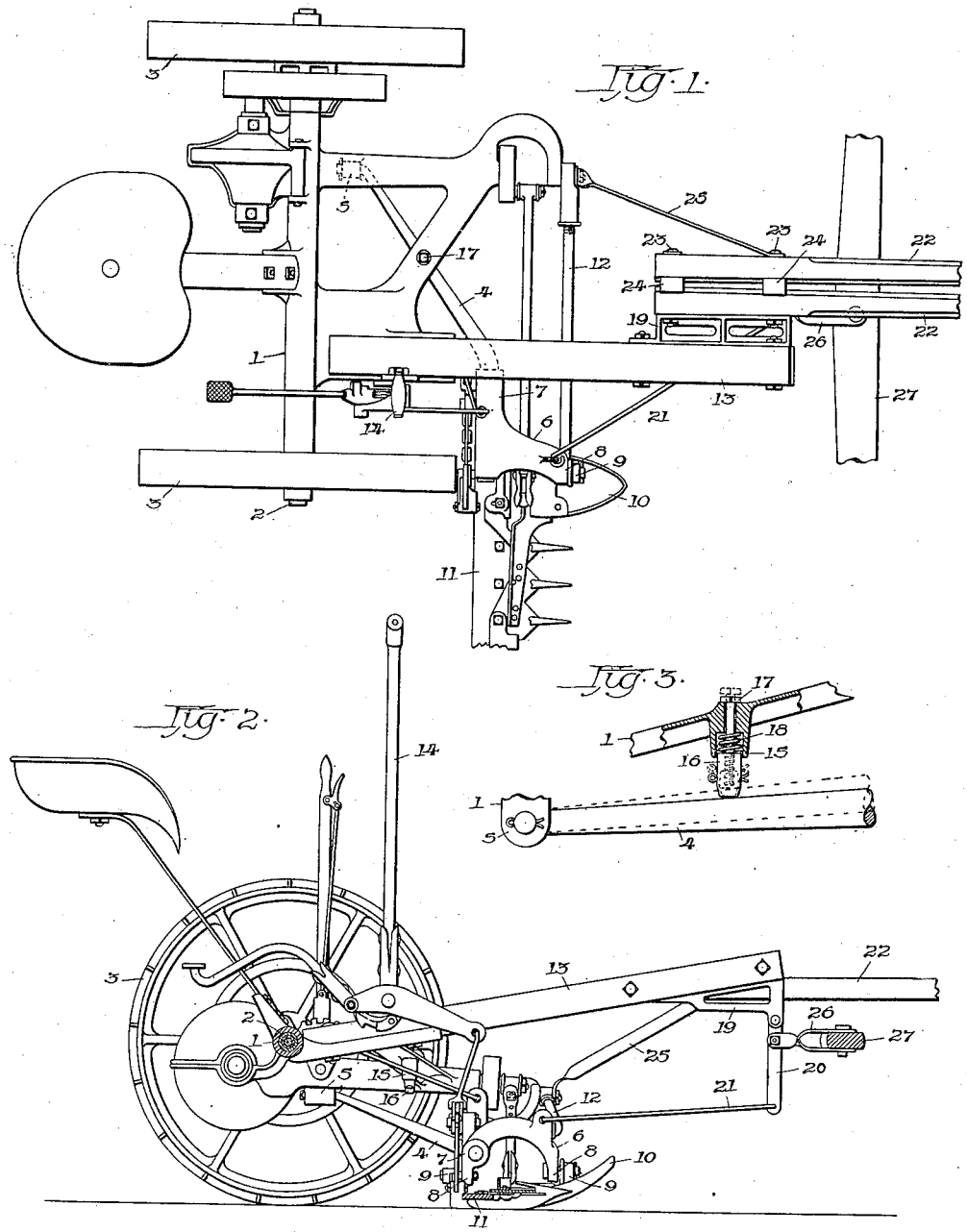
Witnesses:
F. W. Hoffmeister
Inventor.
William Webber
By E. W. Burgess
Attorney

UNITED STATES PATENT OFFICE.

WILLIAM WEBBER, OF BERWYN, ILLINOIS, ASSIGNOR TO INTERNATIONAL HARVESTER COMPANY, A CORPORATION OF NEW JERSEY.

MOWING-MACHINE.

995,829.  Specification of Letters Patent.  Patented June 20, 1911.

Application filed June 23, 1910. Serial No. 568,452.

*To all whom it may concern:*

Be it known that I, WILLIAM WEBBER, a citizen of the United States, residing at Berwyn, in the county of Cook and State of Illinois, have invented certain new and useful Improvements in Mowing-Machines, of which the following is a specification.

My invention relates to mowing machines of the front cut type, in which a coupling frame is connected with the wheeled frame in a manner permitting a rising and falling movement of the grassward end of the coupling frame, with which the cutting apparatus is pivotally connected.

It consists in a yielding contact block retarding the upward swing of the coupling frame, and in an improved draft tongue connection, its object being to provide a construction that will permit a tongue adjustment of the draft devices and a satisfactory adjustment of the cutting apparatus to various angles relative to the wheeled frame. I attain these objects by means of the mechanism illustrated by the accompanying drawings, in which—

Figure 1 represents a top plan view of a mowing machine having my invention forming a part thereof; Fig. 2 is a side elevation of Fig. 1; Fig. 3 is a detail showing the yielding contact block between the wheeled frame and coupling frame.

The same reference numerals designate like parts throughout the several views.

1 represents a wheeled frame of a mowing machine; 2 an axle journaled therein; 3 road wheels journaled upon said axle; 4 a coupling bar having its stubbleward end pivotally connected with the wheeled frame at 5; 6 a coupling yoke having a sleeve 7 that receives the grassward end of the coupling bar in a manner permitting the yoke to have a limited turning movement thereon, the tapering arms 8 having openings in the direction of the line of draft of the machine that receive coupling ears 9 whereby the yoke is connected with the inner shoe 10, to which is secured a cutter bar 11 forming part of the cutting apparatus of the machine, and 12 represents a coupling frame member having its stubbleward end pivotally connected with the wheeled frame substantially in line with the pivotal axis of the coupling bearing and its grassward end pivotally connected with the shoe.

13 represents a stub tongue member secured to the wheeled frame, and 14 a hand lever pivotally mounted upon said stub tongue and flexibly connected with the coupling frame and shoe in a common way, whereby the coupling frame and cutting apparatus may be adjusted to various angles relative to the wheeled frame.

15 represents a socket member forming part of the wheeled frame, 16 a cylindrical block received by the socket in a slidable manner, and 17 a bolt threaded in the block and slidably received by an opening in the frame in a manner to limit the movement of the block in a downward direction.

18 represents a compression spring encircling the body of the bolt and received by the socket and operative to yieldingly resist a movement of the block in an upward direction.

19 represents a draft bracket secured to the stubbleward side of the stub tongue at its forward end, having a pendent link 20 pivotally connected therewith, the lower end of the link being connected with the coupling yoke by means of a draw bar 21.

22 represent tongue members secured to bracket 19 by means of bolts 23, having intervening spacing blocks 24, and 25 represents a brace member extending from the forward bolt to which it is secured rearward, stubbleward and downward, and having its rear end secured to the wheeled frame.

26 represents a clevis connected with the link 20, and 27 a draft evener pivotally connected with the clevis.

What I claim as my invention, and desire to secure by Letters Patent, is:

1. A mowing machine including, in combination, a wheeled frame, a rising and falling coupling frame pivotally connected therewith, and a yielding resistance member attached to a member of said wheeled frame and operative within the path of movement of said coupling frame in a manner to retard an upward movement thereof relative to said wheeled frame.

2. A mowing machine including, in combination, a wheeled frame, a rising and falling coupling frame pivotally connected therewith, a socket member forming part of said wheeled frame, and arranged within the path of said coupling frame, a contact block slidably received by said socket member, and a spring operative to yieldingly resist the sliding movement of said block into said socket, said coupling frame adapted to contact with said block in an upward movement of said coupling frame, the block being operative to yieldingly resist an upward movement of said coupling frame when it has reached a predetermined limit.

WILLIAM WEBBER.

Witnesses:
A. M. CHRISTIAN,
RAY D. LEE.

Copies of this patent may be obtained for five cents each, by addressing the "Commissioner of Patents, Washington, D. C."